United States Patent Office 3,798,242
Patented Mar. 19, 1974

3,798,242
N,N'-DIGLYCIDYL-DICARBOXYLIC ACID DIANILIDES
Hans Batzer, Arlesheim, Juerger Habermeier, Pfeffingen, Basel-Land, and Daniel Porret, Binningen, Switzerland, assignors to Ciba-Geigy AG, Basel, Switzerland
No Drawing. Filed Sept. 23, 1971, Ser. No. 183,234
Claims priority, application Switzerland, Sept. 25, 1970, 14,268/70
Int. Cl. C07d 1/04
U.S. Cl. 260—348 A
2 Claims

ABSTRACT OF THE DISCLOSURE

Compounds of aromatic amines with polycarboxylic acids which possess at least 2 glycidyl groups bonded to the nitrogen atoms of the amide groups, such as, for example, N,N'-diglycidylsebacic acid dianilide or N,N'-diglycidyltetrahydrophthalic acid dianilide. These compounds, together with curing agents for epoxide resins, are suitable for the manufacture of mouldings, coatings or adhesive bonds.

---

The subject of the present invention are new polyglycidyl compounds with at least two glycidyl or β-methylglycidyl groups bonded to amide groups, of the General Formula

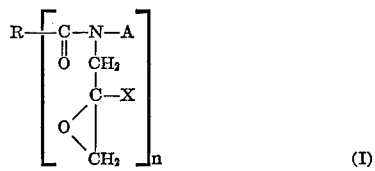

(I)

wherein R denotes an n-valent aliphatic, cycloaliphatic, araliphatic, aromatic or heterocyclic radical, A represents an unsubstituted or substituted monovalent aromatic radical, X denotes a hydrogen atom or the methyl group and n denotes a number greater than 1 and at most 8, preferably 2 or 3.

The radical R is preferably a monovalent or trivalent aliphatic or cycloaliphatic hydrocarbon radical. The radical A preferably denotes a phenyl radical which is either unsubstituted or is substituted by one or more alkyl groups, alkoxy groups, trifluoromethyl groups, halogen atoms or nitro groups.

More preferably, the invention relates to compounds of the Formula I, wherein the radical R denotes a divalent alkylene or alkenylen group having 2 to 18 carbon atoms or a divalent or trivalent cyclohexylen or phenylene group, A represents a phenyl radical which is either unsubstituted or substituted by one or more methyl groups, methoxy groups, trifluoromethyl groups or nitro groups, X denotes hydrogen, and n denotes 2 or 3.

Depending on the starting substance, the new N-glycidyl compounds of the Formula I are colorless to ochre-colored, resinous and tough, to glassy and brittle, monomers. They can be cured with the customary curing agents for epoxide resins to give mouldings having good mechanical properties. Here again, they are distinguished by high reactivities, for example on reaction with anhydride curing agents, such as hexahydrophthalic anhydride. The new polyglycidyl compounds of the Formula I can be manufactured if polyamides of the general formula

(II)

wherein R, A and n have the same meaning as in the Formula I, are reacted in one stage or several stages with an epihalogenohydrin or β-methylepihalogenohydrin, such as, for example, epichlorohydrin, β-methylepichlorohydrin or epibromohydrin, with elimination of hydrogen halide, in a manner which is in itself known.

In the single-stage process, the reaction of epihalogenohydrin with a compound of the Formula II is carried out in the presence of alkali, preferably using sodium hydroxide or potassium hydroxide. In this single-stage process, the epichlorohydrin reacted according to the process can be replaced wholly or partly by dichlorohydrin, which is transiently converted into epichlorohydrin under the process conditions and on appropriate addition of alkali and then reacted as such with the polyamide of the Formula II. In the preferentially used two-stage process the compound of the Formula II is reacted, in a first stage, with an epihalogenohydrin either without catalyst or preferably in the presence of a basic catalyst, to give the N-halogenohydrin compound, and thereafter the latter is dehydrohalogenated in a second stage by means of alkalis, such as potassium hydroxide or sodium hydroxide, to give the glycidyl compound.

The reaction can also be accelerated by adding other suitable catalysts, for example alkali hydroxides, such as sodium hydroxide, or alkali halides, such as lithium chloride, potassium chloride or sodium chloride, bromide and fluoride.

The new polyglycidyl compounds according to the invention, of the Formula I, are preferably manufactured by reacting an epihalogenohydrin, preferably epichlorohydrin, with a compound of the Formula II in the presence of a basic catalyst, such as, preferably, a tertiary amine or a quaternary ammonium base or a quaternary ammonium salt, and treating the resulting product, containing halogenohydrin groups, with agents which split off hydrogen halide.

Suitable basic catalysts for the addition of epichlorohydrin are above all tertiary amines, such as triethylamine, tri-n-propylamine, benzyldimethylamine, N,N'-dimethylaniline and triethanolamine; quaternary ammonium bases, such as benzyltrimethylammonium hydroxide; quaternary ammonium salts, such as tetramethylammonium chloride, tetraethylammonium chloride, benzyltrimethylammonium chloride, benzyltrimethylammonium acetate and methyltriethylammonium chloride; also, ion exchange resins having tertiary or quaternary amino groups, and furthermore trialkylhydrazonium salts, such as trimethylhydrazonium iodide.

Further suitable catalysts are also low molecular thioethers and sulphonium salts or compounds which can be converted with the epihalogenohydrins into thioethers or sulphonium compounds, such as hydrogen sulphide, sodium sulphide or mercaptans.

As such thioethers or sulphonium salts there may be mentioned: diethylsulphide, α-hydroxyethylethylsulphide, β-hydroxypropylethylsulphide, ω-hydroxy-tetramethylene ethylsulphide, thiodiglycol, mono-β-cyanoethylthioglycolether, dibenzylsulphide, benzylethylsulphide, benzylbutylsulphide, trimethylsulphonium iodide, tris(β - hydroxyethyl)sulphonium chloride, dibenzylmethylsulphonium bromide, 2,3 - epoxypropylmethylethylsulphonium iodide, dodecylmethylsulphide and dithiane.

Strong alkalis, such as anhydrous sodium hydroxide or aqueous sodium hydroxide solution, are as a rule used for the dehydrohalogenation; however, other alkaline reagents, such as potassium hydroxide, barium hydroxide, calcium hydroxide, sodium carbonate or potassium carbonate can also be used.

The dehydrohalogenation can, in turn, be carried out in several stages. Thus it is possible first to carry out a treatment with solid sodium hydroxide or potassium hydroxide at elevated temperature and, after distilling off the excess epihalogenohydrin, to heat the residue, in an inert solvent, with an excess of concentrated alkali hydroxide solution, for example 50% strength sodium hydroxide solution.

Possible epihalogenohydrins are epibromohydrin, β-methylepichlorohydrin and above all epichlorohydrin. Good yields are obtained if an excess of epichlorohydrin, and in particular preferably 4 to 40 mols of epichlorohydrin per NH group, are used. During the first reaction stage, before the addition of alkali, a partial epoxidation of the N-chlorohydrin compound to give a compound of the Formula II already takes place. The epichlorohydrin, which acts as a hydrogen chloride acceptor, is thereby partially converted into glycerine dichlorohydrin. Given the treatment with alkali, epichlorohydrin is again regenerated from the glycerine dichlorohydrin.

Since the polyamides of the Formula II are as a rule sparingly soluble in customary solvents, it is advantageous to carry out the reaction with the epihalogenohydrin in suspension; the polyamide, for example a dianilide, is here suspended in epichlorohydrin, and this suspension, with or without prior reaction, is treated with alkali hydroxide solution in small portions, for example at 60° C., under azeotropic circulatory distillation; the alkali hydroxide solution is advantageously added more slowly than in other known glycidylations. The working up and isolation of the polyglycidyl compounds obtained as end products can be carried out in the usual manner.

The polyamides of the Formula II are known compounds which are accessible from cheap starting substances available on a large industrial scale, such as, above all, from aniline or toluidine and aliphatic, cycloaliphatic or aromatic dicarboxylic acids, such as adipic acid, sebacic acid, tetrahydrophthalic acid, hexahydrophthalic acid, maleic acid and phthalic acid. They are obtained in a known manner by condensing 1 mol of a polycarboxylic acid of the general formula

(III)

with $n$ mols of an aromatic primary monoamine of the formula $$H_2N—A \qquad (IV)$$

wherein R, A and $n$ have the same meaning as in the Formula I.

As polycarboxylic acids of the Formula III, dicarboxylic acids, tricarboxylic acids and tetracarboxylic acids of the aliphatic, cycloaliphatic, araliphatic, aromatic and heterocyclic series are preferentially used.

As polycarboxylic acids of the aliphatic series there may, for example, be mentioned: oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, alkylsuccinic acids, alkenylsuccinic acids, such as dodecenylsuccinic acid or ethylbutenylsuccinic acid, α- and β-methyl-suberic acid, 2,2,4- and 2,4,4-trimethyladipic acid, diethylmalonic acid, 2,5-dimethyladipic acid, 2,2-dimethylglutaric acid, α, α'-dimethylsebacic acid, α,α'-dibutylsebacic acid, maleic acid, fumaric acid, itaconic acid, citraconic acid, mesaconic acid, ethylidenemalonic acid, isopropylidenemalonic acid, 1,2,4-butanetricarboxylic acid, 1,2,3-propanetricarboxylic acid, tricarballylic acid, 1,1,5-pentanetricarboxylic acid, 1,2,4-hexanetricarboxylic acid, 2-propyl-1,2,4-pentanetricarboxylic acid, 5-octene-3,3,6-tricarboxylic acid, dimerized and trimerized unsaturated fatty acids and their hydrogenation products, such as dimerized oleic acid, dimerized linoleic acid, dimerized linolenic acid, dimerized ricinenic acid and dimerized castor oil fatty acid.

As polycarboxylic acids of the cycloaliphatic series there may be mentioned: Δ⁴-tetrahydrophthalic acid, 4-methyl - Δ⁴ - tetrahydrophthalic acid, hexahydrophthalic acid, 4-methylhexahydrophthalic acid, 3-carboxy-6-methyl-Δ⁴-tetrahydrophthalic acid, 3,6-endomethylene-Δ⁴-tetrahydrophthalic acid ("nadic acid"), methyl-3,6-endomethylene - Δ⁴-tetrahydrophthalic acid, 3,4,5,6,7,7-hexachloro-3,6-endomethylene-Δ⁴-tetrahydrophthalic acid ("chlorendic acid"), dimerized abietic acid, 7-allyl-bicyclo(2.2.1) hept-5-ene-2,3-dicarboxylic acid and hydrogenated benzenetricarboxylic and benzenetetracarboxylic acids. As polycarboxylic acids of the aromatic series there may be mentioned: o-phthalic acid, isophthalic acid, terephthalic acid, benzenetricarboxylic acids, such as trimellitic acid, trimesic acid and hemimellitic acid, benzenetetracarboxylic acids, such as pyromellitic acid, naphthalenedicarboxylic acids, such as naphthalene-1,8-dicarboxylic acid and naphthalene - 2,6-dicarboxylic acid, diphenyl-o,o'-dicarboxylic acid, diphenyl-p,p'-dicarboxylic acid, diphenylmethane-p, p'-dicarboxylic acid, diphenylether-p,p'-dicarboxylic acid, 3,4,5,6-tetrachlorophthalic acid, and mellitic acid. As polycarboxylic acids of the heterocyclic series, pyridinedicarboxylic acids, pyridinetricarboxylic acids and pyridinetetracarboxylic acids may, for example, be mentioned.

Technical mixtures of the abovementioned polycarboxylic acids can also be used.

Further, mixed aliphatic-cycloaliphatic or aliphatic-aromatic polycarboxylic acids can be used; as examples, etherpolycarboxylic acids, such as ethylene glycol-bis(p-carboxyphenylether) or the aliphatic-aromatic polycarboxylic acids obtainable by reaction of polyphenols, such as resorcinol or diphenylolpropane, with chloroacetic acid, may be mentioned.

Suitable polycarboxylic acids of the Formula III are furthermore polycarboxy-polyesters which in addition to ester groups contain 2 to eight carboxyl groups, and which are obtained in a known manner by condensation of a polyalcohol with one of the abovementioned polycarboxylic acids or their anhydrides in a suitable mutual molar ratio. Suitable polyols for the manufacture of such polycarboxy-polyesters are, for example: diols, such as ethylene glycol, diethylene glycol, triethylene glycol, tetraethylene glycol, 1,2-propylene glycol, 1,3-propylene glycol, dipropylene glycol, tripropylene glycols, polyoxyethylene glycols, polyoxypropylene glycols, 1,2-butanediol, 1,4-butanediol,1,5-pentanediol, 2,4-pentanediol, 2,2-dimethyl-trimethylene glycol, 1,4-hexanediol, 1,5-hexanediol, 1,6-hexanediol, 2,5-hexanediol, 3-methylpentane-1,5-diol, 2-methylpentane-2,5-diol, 3-methylpentane-2,5-diol, 2,2 - diethylpropane - 1,3-diol, 2,2-diethylhexane-1,3-diol, 2,5-dimethylhexane-2,5-diol, 1,12-dodecanediol, 1,12-octadecanediol and 2-butyne-1,4-diol; quinitol, cyclohexane-1,1-dimethanol and 2,2-bis(4-hydroxycyclohexyl)propane; triols, such as glycerine, trimethylolmethane, 1,1,1-trimethylolethane, 1,1,1-trimethylol-propane, hexane-1,2,6-triol and 2,4-dihydroxy-3-hydroxymethylpentane; tetrahydric polyols, such as diglycerine and pentaerythritol, and hexahydric polyols, such as mannitol and sorbitol.

As examples of such polycarboxy-polyesters there may be mentioned the acid esters from 1 mol of a glycol, such as ethylene glycol or 1,4-butanediol, and 2 mols of a dicarboxylic acid such as adipic acid or terephthalic acid or 2 mols of a dicarboxylic anhydride, such as maleic anhydride or phthalic anhydride, and also the acid esters from 1 mol of a triol, such as glycerine, or of a tetrahydric polyol, such as pentaerythritol, and of 3 or 4 mols of a dicarboxylic acid, such as adipic acid, or of a dicarboxylic anhydride, such as maleic anhydride. Further, acid polyesters from 1 mole of a glycol, such as ethylene glycol or butanediol, and 2 mols of a tricarboxylic acid anhydride, such as trimellitic anhydride or 1,2,4-butanetricarboxylic acid anhydride, should be mentioned.

As aromatic primary monoamines of the Formula IV, monoaminobenzenes which are unsubstituted or substituted in the benzene nucleus by alkyl groups, alkoxy groups, trifluoromethyl groups, nitro groups or halogen atoms can above all be used. There may be mentioned: aniline, o-, m- and p-toluidine, 2,3-xylidine, 2,4-xylidine, 2,6-xylidine, 2,5-xylidine, 3,4-xylidine, 3,5-xylidine, o-, m- and p-ethylaniline, o-, m- and p-anisidine, o-, m- and p-phenetidine, cresidine, 3-trifluoromethyl-aniline, 4-trifluoromethyl-aniline, o-, m- and p-chloroaniline, o-, m- and p-bromoaniline, 2,5-dichloroaniline, 3,4-dichloroaniline, 2,4,6-trichloroaniline, o-, m- and p-nitroaniline, 2,4-dinitroaniline and 2,4,6-trinitroaniline.

Further, polynuclear aromatc primary monoamines can also be used, such as 4-phenoxyaniline, α-naphthylamine and β-naphthylamine.

The new polyglycidyl compounds according to the invention, of the Formula I, react with the customary curing agents for polyepoxide compounds can therefore be crosslinked or cured by addition of such curing agents, analogously to other polyfunctional epoxide compounds or epoxide resins. As such curing agents, basic or acid compounds can be used.

As suitable curing agents there may, for example, be mentioned: amines or amides, such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3, bis-(4-amino-3-methyl-cyclohexyl)-methane, 3,5,5-trimethyl-3-(amino-methyl)-cyclohexylamine ("isophoronediamine"), Mannich bases, such as 2,4,6-tris-(dimethylaminomethyl)-phenol; m-phenylenediamine, p-phenylenediamine, bis-(4-aminophenyl)-methane, bis-(4-aminophenyl)-sulphone and m-xylylenediamine; N-(2-aminoethyl)-piperazine; adducts of acrylonitrile or monoepoxides, such as ethylene oxide or propylene oxide, to polyalkylenepolyamines, such as diethylenetriamine or triethylenetetramine; aducts of polyamines, such as diethylenetriamine or triethylenetetramine in excess, and polyepoxides, such as diomethanepolyglycidylethers; ketimines, for example from acetone or methyl ethyl ketone and bis(p-amino-phenyl)-methane; adducts of monophenols or polyphenols and polyamines; polyamides, especially those from aliphatic polyamines, such as diethylenetriamine or triethylenetetramine, and dimerized or trimerized unsaturated fatty acids, such as dimerized linseed oil fatty acid ("Versamid"); polymeric polysulphides ("Thiokol"); dicyandiamide, aniline- formaldehyde resins, polyhydric phenols, for example resorcinol, 2,2-bis-(4-hydroxyphenyl)-propane or phenol-formaldehyde resins; boron trifluoride and its complexes with organic compounds, such as $BF_3$-ether complexes and $BF_3$-amine complexes, for example $BF_3$-monoethylamine complex; acetoacetanilide-$BF_3$ complex; phosphoric acid; triphenylphosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, methyl-3,6-endomethylene-$\Delta^4$-tetrahydrophthalic anhydride (=methylnadic anhydride), 3,4,5,6,7,7 - hexachloro-3,6-endomethylene-$\Delta^4$-tetrahydrophthalic anhydride, succinic anhydride, adipic anhydride, azelaic anhydride, sebacic anhydride, maleic anhydride, dodecenyl-succinic anhydride; pyromellitic dianhydride or mixtures of such anhydrides.

Curing accelerators can furthermore be employed in the curing reaction; when using polyamides, dicyandiamide, polymeric polysulphides or polycarboxylic acid anhydrides as curing agents, suitable accelerators are, for example, tertiary amines, their salts or quaternary ammonium compounds, for example 2,4,6-tris-(dimethylaminomethyl)-phenol, benzyldimethylamine, 2-ethyl-4-methylimidazole, 4-amino-pyridine and triamylammonium phenolate, and also alkali metal alcoholates, such as, for example, sodium hexanetriolate. In the amine curing reaction, monophenols or polyphenols, such as phenol or diomethane, salicylic acid or thiocyanates, can for example be employed as accelerators.

The term "curing" as used here denotes the conversion of the abovementioned polyepoxides into insoluble and infusible, crosslinked products, and in particular, as a rule, with simultaneous shaping to give mouldings, such as castings, pressings or laminates and the like, or to give "sheet-like structures," such as coatings, coverings, lacquer films or adhesive bonds.

Depending on the choice of the curing agent, the curing reaction can be carried out at room temperature (18–25° C.), or at elevated temperature (for example 50–180° C.).

The curing can, if desired, also be carried out in 2 stages, by first prematurely stopping the curing reaction or carrying out the first stage at only moderately elevated temperature, whereby a still fusible and soluble, curable precondensate (a so-called "B-stage") is obtained from the epoxide component and the curing agent component. Such a precondensate can, for example, be used for the manufacture of "Prepregs," compression moulding compositions or sintering powders.

A further subject of the present invention are therefore curable mixtures which are suitable for the manufacture of mouldings, including sheet-like structures, and which contain the polyglycidyl compounds according to the invention, optionally together with other polyepoxide compounds and also curing agents for epoxide resins, such as polyamines or polycarboxylic acid anhydrides.

The polyepoxides according to the invention or their mixtures with other polyepoxide compounds and/or curing agents can furthermore be mixed, in any stage before curing, with customary modifiers, such as extenders, fillers and reinforcing agents, pigments, dyestuffs, organic solvents, plasticizers, flow control agents, agents for conferring thixotropy, flame-proofing substances and mould release agents.

As extenders, reinforcing agents, fillers and pigments which can be employed in the curable mixtures according to the invention there may, for example, be mentioned: coal tar, bitumen, glass fibres, boron fibres, carbon fibres, asbestos fibres, natural and synthetic textile fibres, such as polyester fibres, polyamide fibres and polyacrylonitrile fibres; polyethylene powder and polypropylene powder; quartz powder; mineral silicates, such as mica, asbestos powder and slate powder; kaolin, aluminium oxide trihydrate, chalk powder, gypsum, antimony trioxide, bentones, silica aerogel ("Aerosil"), lithopone; baryte, titanium dioxide, carbon black, graphite, oxide pigments, such as iron oxide, or metal powders, such as aluminium powder or iron powder.

Suitable organic solvents for modifying the curable mixtures are, for example, toluene, xylene, n-propanol, butyl acetate, acetone, methyl ethyl ketone, diacetone-alcohol, ethylene glycol monomethyl ether, monoethyl ether and monobutyl ether.

As plasticizers for modifying the curable mixtures, dibutyl phthalate, dioctyl phthalate and dinonyl phthalate, tricresyl phosphate, trixylenyl phosphate and also polypropylene glycol can, for example, be employed.

As flow control agents when employing the curable mixtures, especially in surface protection, silicones, cellulose acetobutyrate, polyvinylbutyral, waxes, stearates and the like (which in part are also used in mould release agents) may, for example, be added.

Particularly for use in the lacquer field, the polyepoxide compounds can furthermore be partially esterified in a known manner with carboxylic acids such as, in particular, higher unsaturated fatty acids. It is furthermore possible to add other curable synthetic resins, for example phenoplasts or aminoplasts, to such lacquer resin formulations.

The curable mixtures according to the invention can be manufactured in the usual manner, with the aid of known mixing equipment (stirrers, kneaders, rolls and the like).

The curable epoxide resin mixtures according to the invention are above all employed in the fields of surface protection, the electrical industry, laminating processes and the building industry. They can be used in a formulation suited in each case to the special end use, in the unfilled or filled state, optionally in the form of solutions or emulsions, as paints, lacquers, compression moulding compositions, sintering powders, dipping resins, casting resins, injection moulding formulations, impregnating resins and binders, adhesives, tool resins, laminating resins, sealing and filling compositions, floor covering compositions and binders for mineral aggregates.

In the examples which follow unless otherwise stated, parts denote parts by weight and percentages denote percentages by weight. The relationship of parts by volume to parts by weight is as of the millilitre to the gram.

In order to determine the mechanical and electrical properties of the curable mixtures described in the examples which follow, sheets of size 92 x 41 x 12 mm. were manufactured for determining the flexural strength, deflection, impact strength and water absorption. The test specimens (60 x 10 x 4 mm.), for determining the water absorption and for the flexural test and impact test (VSM 77,103 and VSM 77,105 respectively) were machined from the sheets.

For determining the heat distortion point according to Martens (DIN 53,458), test specimens of size 120 x 15 x 10 mm. were cast in each case.

To test the arcing resistance and tracking resistance (VDE 0303), sheets of size 120 x 120 x 4 mm. were cast.

MANUFACTURING EXAMPLES

Example 1

N,N'-diglycidyl-sebacic acid dianilide.—A suspension of 176.1 g. (0.5 mol) of sebacic acid dianilide (melting point=197–198° C.), 1850 g. (20 mols) of epichlorohydrin and 6.96 g. of a 50% strength aqueous tetramethylammonium chloride solution is stirred for 60 minutes at 114–115° C. under reflux. Hereupon, the anilide very largely dissolves. A strong circulatory distillation is then so adjusted, by applying a waterpump vacuum at a bath temperature of 140° C., that the temperature of the reaction mixture is 60° C.; hereupon a considerable part of the anilide precipitates again.

96 g. of 50% strength aqueous sodium hydroxide solution are now added dropwise under the conditions described above over the course of 3½ hours, with vigorous stirring; in the course thereof, the anilide gradually dissolves and a suspension of NaCl is formed; thereafter the distillation is continued until no further traces of water are eliminated from the system, this requiring about 30 minutes. The reaction mixture is cooled to 30° C.; the sodium chloride produced in the reaction is then removed by filtration. The residue is washed with 100 ml. of epichlorohydrin and the combined epichlorohydrin solutions are extracted by shaking with 150 ml. of water, to remove alkali, sodium chloride and the last traces of the catalyst. After separating off the aqueous phase, the pale yellow solution is treated with 100 ml. of water and distilled on a rotary evaporator at 60° C. under a slight vacuum until the water and the bulk of the epichlorohydrin have been removed. Finally, 100 ml. of toluene are added and the mixture is concentrated to dryness. Thereafter, the volatile constituents are removed at 70° C./0.2 mm. Hg until constant weight is reached.

232 g. of a clear, pale yellowish crude product (100% of theory). are obtained, having an epoxide content of 4.07 equivalents/kg. (94.5% of theory). The product is obtained in glass-clear, sharp-edged slightly sticky lumps. The total chlorine content is about 0.8%. The proton-magnetic resonance spectrum (recorded in CDCl$_3$+dimethylsulphoxide at 35° C., against tetramethylsilane as the internal standard) agrees with the structure given below. Amongst others, the following signals are found:

12H at δ=1.1–1.7 (multiplet): —(C$\underline{H}_2$)$_6$—
4 H at δ=1.9–2.3 (multiplet):

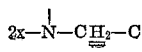

10 H at δ=2.5–5.2 (multiplet):

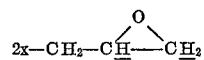

10 H at δ=6.55–7.38 (multiplet):

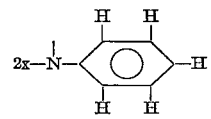

The mass spectrum shows the molecule-ion at 464 mass units (MU) (calculated molecular weight=464.58), and alongside characteristic fragment-ions at 447 MU and 408 MU (=molecule-ion minus

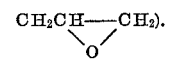

In addition, a trace of a molecule-ion at 352 MU is found as a slight impurity, originating from a very small amount of unreacted dianilide.

The molecular weight determination by vapor pressure osmometry (at 100° C. in dimethylformamide) gives a numerical average molecular weight which agrees with both the value determined by mass spectroscopy and with theory: M$_{os}$=464.

The product obtained accordingly essentially consists of a compound of the following structure:

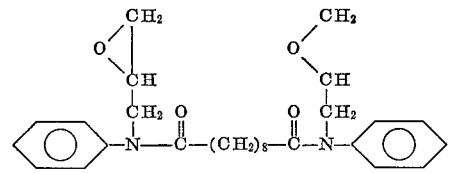

Example 2

N,N'-diglycidyl-adipic acid dianilide.—A suspension of 148.5 g. (0.5 mol) of adipic acid dianilide (melting point=231–233° C.), 1850 g. (20 mols) of epichlorohydrin and 5.8 g. of a 50% strength aqueous tetramethylammonium chloride solution is stirred for 60 minutes at 112–115° C., analogously to the description in Example 1. In the courses thereof, only very little of the anilide dissolves. Dehydrohalogenation is then carried out, analogously to the description in Example 1, with 96 g. of 50% strength aqueous sodium hydroxide solution at 60° C. over the course of 3½ hours. In the course thereof, the thick suspension of the anilide changes into a fine, mobile suspension of sodium chloride in the organic phase. Thereafter the mixture is cooled to 30° C. and worked up as described in Example 1.

204.3 g. of a very hard, brittle, glass-clear solid colored pale yellow-orange are obtained (100% of theory). The epoxide content is 4.62 equivalents/kg. (94.4% of theory). The total chlorine content is 1.3%. The product melts at about 140–145° C.

Determination of the numerical average molecular weight by vapor pressure osmometry gives M$_{os}$=409 (M$_{theory}$=408.5). The mass spectrum shows the molecule-ion at 408 MU. Characteristic fragment-ions at MU=391, 390, 377, 352 and 302.

The proton-magnetic spectrum shows that the product essentially consists of the compound of the following structural formula:

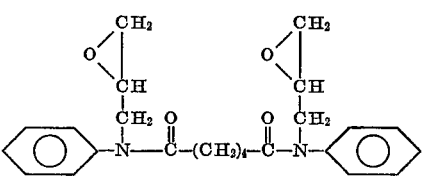

Example 3

N,N - diglycidyl - sebacic acid bis-(4-nitroanilide).—A mixture of 84 g. (0.192 mol) of a crude sebacic acid bis- (4-nitroanilide) (purity approx. 85-90%), 1205 g. of epichlorohydrin (13 mols) and 8.63 g. of 50% strength aqueous tetramethylammonium chloride is heated to the boil for two hours, whilst stirring. Dehydrohalogenation is then carried out analogously to the description in Example 1, with 65 g. of 50% strength aqueous sodium hydroxide solution at 60° C. whilst stirring vigorously. The working up and isolation of the diglycidyl compound is also carried out in accordance with Example 1.

107.8 g. of a greenish-colored epoxide resin are obtained, having an epoxide content of 3.9 equivalents/kg.; the total chlorine content is 2.9%. The product essentially consists of the compound of the formula

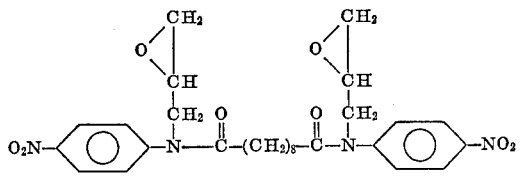

Example 4

N,N'-diglycidyl-hexahydrophthalic acid dianilide.—A solution of 68 g. of hexahydrophthalic acid dianilide crude product (0.2 mol) in 894 ml. of epichlorohydrin (11.27 mols) is stirred together with 2.3 g. of a 50% strength aqueous tetramethylammonium chloride solution for 60 minutes under reflux at 116–117° C. 42.2 g. of 50% strength sodium hydroxide solution (0.527 mol) are then added dropwise over the course of 3 hours under the conditions described in Example 1. The working up is also carried out in accordance with Example 1. 28 g. of a highly viscous, ochre-colored substance are obtained, having an epoxide content of 2.52 equivalents/kg. (55% of theory); the total chlorine content is 1.9%.

Example 5

N,N'-diglycidyl-maleic acid dianilide.—A solution of 245 g. (0.921 mol) of maleic acid dianilide (melting point=188.9° C.) in 3,410 g. of epichlorohydrin (36.85 mols), which is clear and colorless at 115° C., and 6.1 g. of 50% strength aqueous tetramethylammonium chloride solution, are stirred for 60 minutes at the same temperature and subsequently dehydrohalogenation is carried out over the course of two and a half hours with 184.3 g. of 50% strength aqueous sodium hydroxide solution, under the conditions mentioned in Example 1. Working up is also carried out in accordance with Example 1. 202 g. (58% of theory) of a red epoxide resin melting at 73° C. are obtained. The epoxide content is 4.89 equivalents/kg. (corresponding to 92.3% of theory). The elementary analysis shows a nitrogen content of 7.4%, corresponding exactly to theory. The new diglycidyl compound accordingly has the following structure:

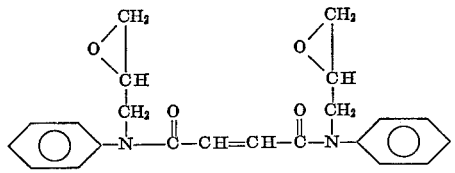

Example 6

N,N'-diglycidyl - sebacic acid di(m - trifluoromethyl anilide).—217 g. of sebacic acid di-(3 - trifluoromethyl-anilide) (melting point 152–154° C.) (0.445 mol) together with 2470 g. of epichlorohydrin (26.7 mols) and 2.7 kg. of a 50% strength aqueous tetramethylammonium chloride solution are stirred for one hour at 110–115° C., in accordance with Example 1. The mixture is then dehydrohalogenated over the course of 3 hours with 89 g. of 50% strength aqueous sodium hydroxide solution 60° C., as described in Example 1; thereafter it is worked up analogously to Example 1. 267 g. (100% of theory) of a clear, whitish-yellow resin are obtained, having a softening point at about room temperature. The epoxide content is 3.12 equivalents/kg. (93.7% of theory); the new diglycidyl compound essentially corresponds to the following structure:

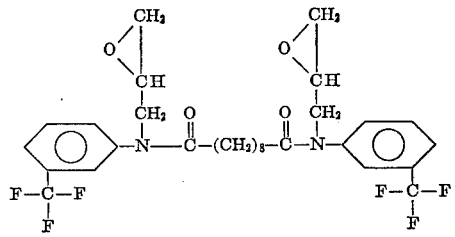

Example 7

N,N'-diglycidyl-sebacic acid di-(4-methylanilide).—261 g. (0.686 mol) of sebacic acid di - (4 - methyl - anilide) (melting point=203–204° C.), 2,528 g. of epichlorohydrin (27.45 mols), 5.05 g. of a 50% strength aqueous tetramethylammonium chloride solution and, subsequently, 137.3 g. of a 50% strength aqueous sodium hydroxide solution (1.715 mol) are reacted with one another exactly analogously to Example 1. Working up also takes place in accordance with Example 1. 336 g. of a clear, solid, pale yellow resin (99.4% of theory) are obtained, melting at about 117° C. The epoxide content is 2.95 equivalents/kg. (72.7% of theory).

Example 8

N,N'-diglycidyl - sebacic acid di - (2,5 - dimethoxy-anilide).—Analogously to Example 1, 236.4 g. (0.5 mol) of sebacic acid di-(2,5-dimethoxy-anilide) (melting point =100–102° C.) in 2,775 g. of epichlorohydrin (30 mols) are reacted with 100 g. of 50% strength aqueous sodium hydroxide solution (1.25 mols), with the aid of 5.0 g. of a 50% strength aqueous tetramethyl-ammonium chloride solution under the conditions described above, and worked up as mentioned.

292.4 g. (100% of theory) of a brown, clear, highly viscous diepoxide with 2.4 epoxide equivalents (69.0% of theory) and 1.2% of total chlorine are isolated.

Example 9

N,N'-diglycidyl - sebacic acid di - (2,4,5 - trichloro-anilide).—168 g. (0.3 mol) of sebacic acid di-(2,4,5-trichloroanilide) are reacted in accordance with Example 1 with 1,665 g. of epichlorohydrin (18 mols) and 60 g. of 50% strength aqueous sodium hydroxide solution, with the aid of 2 g. of a 50% strength sodium tetramethyl-ammonium chloride solution; working up also takes place according to Example 1. A tough, brown resin with 1.73 epoxide equivalents/kg. (53% of theory) is obtained.

Example 10

Analogously to Example 1, 120 g. (0.503 mol) of the reaction product of trimethyladipic acid and aniline, in the ratio of 1:2, are reacted with 1,860.0 g. of epichlorohydrin (20.1 mols), using 6.6 g. of a 50% strength aqueous tetramethylammonium chloride solution. The dehydrohalogenation is carried out in accordance with Example 1, using 96.6 g. of 50% strength aqueous sodium hydroxide solution. The mixture is worked up as described in Example 1, and 109 g. of a yellow-brown, solid resin are obtained (62% of theory). The epoxide content is 3.90 val./kg. (corresponding to 69.3% of theory).

Example 11

Analogously to Example 1, 113 g. (0.213 mol) of the reaction product of dodecenylsuccinic anhydride and aniline (in the ratio of 1:2) are reacted with 788 g. of epichlorohydrin (8.52 mols) and 40.9 g. of 50% strength aqueous sodium hydroxide solution (0.512 mol), with the aid of 2.80 g. of 50% strength aqueous tetramethylammonium chloride solution, the product also being isolated exactly in accordance with Example 1. 116.5 g. of a dark brown, highly viscous substance are obtained, containing 3.77 epoxide equivalents/kg. (corresponding to 100% of theory).

Example 12

Analogously to Example 1, 70 g. (0.117 mol) of the reaction product of trimellitic anhydride and 2,5-dimethoxyaniline (in the ratio of 1:3) are reacted with 650 g. of epichlorohydrin (7.07 mols) and 33.8 g. of 50% strength aqueous sodium hydroxide solution (0.422 mol) under the catalytic influence of 2.3 g. of 50% strength aqueous tetramethylammonium chloride solution, and the end product is isolated as described in Example 1. 70.5 g. (78.8% of theory) of a dark brown solid resin are obtained; the epoxide content is 3.47 val./kg. (corresponding to 88.5% of theory).

USE EXAMPLES

Example I 59.6 g. of the N,N'-diglycidyl-adipic acid dianilide manufactured according to Example 2, with 4.62 epoxide equivalents/kg., are melted in a casting mould at 150° C. to give a clear melt of low viscosity. 40.4 g. of hexahydrophthalic anhydride are rapidly stirred into this melt. The mixture is then at a temperature of 120° C. Gelling and curing take place immediately, with an exothermic reaction, to give a hard, insoluble and infusible, clear and transparent, reddish-colored casting.

Example II 85 g. of the N,N'-diglycidyl-sebacic acid bis-(4-nitroanilide) manufactured according to Example 3, with 3.9 epoxide equivalents/kg., are stirred with 49 g. of hexahydrophthalic anhydride at 80° C. to give a homogeneous mixture. The mixture is immediately introduced into aluminium moulds prewarmed to 80° C. and thereafter gelling immediately occurs, with an exothermic reaction.

For complete curing, the mixture is treated further at 140° C. for 10 hours. Mouldings having the following properties are obtained:

Flexural strength (VSM 77,103) ____kp./mm.$^2$__ 5-6.3
Deflection (VSM 77,103) _____mm__ 2.1
Impact strength (VSM 77,105) ___cm. kp./cm.$^2$__ 4.5
Water absorption (4 days/20° C.) _____percent__ 0.29

We claim:
1. A polyglycidyl compound having the formula:

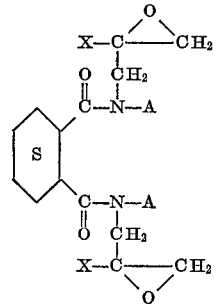

wherein A is phenyl or a phenyl substituted with at least one methyl, methoxy, trifluoromethyl or nitro group; and X is methyl or hydrogen.

2. A polyglycidyl compound according to claim 1 which is N,N'-diglycidyl-hexahydrophthalic acid dianilide.

References Cited
UNITED STATES PATENTS
2,730,531    1/1956    Payne et al. _____ 260—348

NORMA S. MILESTONE, Primary Examiner

U.S. Cl. X.R.

260—78 R